United States Patent
Nakabayashi

(10) Patent No.: US 7,690,262 B2
(45) Date of Patent: Apr. 6, 2010

(54) PRESSURE SENSOR DEVICE INCLUDING TEMPERATURE SENSOR CONTAINED IN COMMON HOUSING

(75) Inventor: Hideki Nakabayashi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 12 days.

(21) Appl. No.: 12/073,068

(22) Filed: Feb. 29, 2008

(65) Prior Publication Data

US 2008/0250862 A1    Oct. 16, 2008

(30) Foreign Application Priority Data

Apr. 13, 2007   (JP)   ............................. 2007-106185

(51) Int. Cl.
*G01L 19/04* (2006.01)

(52) U.S. Cl. .............................. 73/708; 73/753; 73/756

(58) Field of Classification Search ............ 73/700–756
See application file for complete search history.

(56) References Cited

U.S. PATENT DOCUMENTS

| | | | |
|---|---|---|---|
| 5,948,989 A * | 9/1999 | Ichikawa et al. ............... | 73/708 |
| 6,003,379 A * | 12/1999 | Ichikawa et al. ............... | 73/708 |
| 6,053,049 A * | 4/2000 | Chen et al. .................... | 73/756 |
| 6,142,020 A * | 11/2000 | Kim et al. ...................... | 73/714 |
| 6,212,946 B1 * | 4/2001 | Naegele et al. ........... | 73/114.31 |
| 6,272,913 B1 * | 8/2001 | Naegele et al. ........... | 73/114.31 |
| 6,651,508 B2 * | 11/2003 | Baba et al. ..................... | 73/754 |
| 6,971,269 B2 * | 12/2005 | Nomura ........................ | 73/708 |
| 7,043,993 B2 * | 5/2006 | Hayashi et al. ............... | 73/708 |
| 7,216,546 B2 * | 5/2007 | Hayashi et al. ............... | 73/708 |
| 7,234,358 B2 * | 6/2007 | Saito et al. .................... | 73/754 |
| 7,260,992 B2 * | 8/2007 | Hayashi et al. ............... | 73/700 |
| 7,401,521 B2 * | 7/2008 | Bellini et al. .................. | 73/706 |

(Continued)

FOREIGN PATENT DOCUMENTS

JP    A-H6-132335    5/1994

(Continued)

OTHER PUBLICATIONS

Office Action dated Apr. 21, 2009 from the Japan Patent Office in the corresponding JP Application No. 2007-106185 (and English Translation).

(Continued)

*Primary Examiner*—Lisa M Caputo
*Assistant Examiner*—Jermaine Jenkins
(74) *Attorney, Agent, or Firm*—Posz Law Group, PLC

(57) ABSTRACT

A pressure sensor device includes a temperature sensor mounted on a common housing composed of a resin head and a resin pipe both hermetically connected to each other. The pressure sensor device is mounted on, for example, on an intake manifold of an internal combustion engine to measure an amount of air supplied to the engine based on detected pressure and temperature of the air. A pressure sensor is mounted on the resin head, and a temperature sensor element is supported in the resin pipe. A lead wire of the temperature sensor element such as a thermistor is electrically connected to a conductor bar embedded in the resin pipe. The temperature sensor is directly exposed to the air in the intake manifold, and a size of the temperature sensor and the lead wire is made small to make a response speed of the temperature sensor element high.

12 Claims, 4 Drawing Sheets

U.S. PATENT DOCUMENTS

| | | | |
|---|---|---|---|
| 7,478,560 B2 * | 1/2009 | Kuznia et al. | 73/724 |
| 2004/0134282 A1 * | 7/2004 | Hayashi et al. | 73/708 |
| 2005/0218123 A1 | 10/2005 | Hayakawa et al. | |
| 2005/0229708 A1 | 10/2005 | Nomura | |

FOREIGN PATENT DOCUMENTS

| | | |
|---|---|---|
| JP | A-H7-140013 | 6/1995 |
| JP | A-H9-5173 | 1/1997 |
| JP | A-H11-185855 | 7/1999 |
| JP | A-2006-194682 | 7/2006 |
| JP | A-2006-194683 | 7/2006 |

OTHER PUBLICATIONS

Office Action dated Jul. 7, 2009 from the Japan Patent Office in the corresponding JP Application No. 2007-106185 (and English Translation).

* cited by examiner

PRESSURE SENSOR DEVICE INCLUDING TEMPERATURE SENSOR CONTAINED IN COMMON HOUSING

CROSS-REFERENCE TO RELATED APPLICATION

This application is based upon and claims benefit of priority of Japanese Patent Application No. 2007-106185 filed on Apr. 13, 2007, the content of which is incorporated herein by reference.

BACKGROUND OF THE INVENTION

1. Field of the Invention

The present invention relates to a pressure sensor device that includes a temperature sensor contained in a common housing, and especially to such a pressure sensor device in which a response speed of the temperature sensor is improved.

2. Description of Related Art

Some examples of the pressure sensor device including a temperature sensor are disclosed in JP-A-2006-194682, JP-A-2006-194683 and JP-A-2005-274412. With reference to FIG. 5 attached hereto that shows an outline of a pressure sensor device disclosed in JP-A-2006-194682, a structure of a conventional pressure sensor device will be explained. A housing of the pressure sensor device 100 is composed of a resin head 10 and a resin pipe 30, both connected to each other. Terminals 11 for making electrical connections to an outside circuit are insert-molded in the resin head 10. A pressure sensor element 20 is mounted on a depressed portion 12 formed on the resin head 10 and electrically connected to one of the terminals 11.

The resin pipe 30 includes an upper end forming a pressure-detecting chamber 16 and a lower end 31 for introducing air, a pressure of which is to be detected. In the resin pipe 30, an air passage 31a and a space 31b for mounting a temperature sensor 40 are formed. The air passage 31a and the space 31b are separated from each other by a separator 32. A temperature sensor element 40 is disposed close to the lower end 31 and electrically connected to a connecting portion 23 through a lead wire 24. The connecting portion 23 is connected to one of the terminals 11. The lead wire 24 is supported in the space 31b with a resilient cushion member 25 made of a material such as resin.

As the temperature sensor element 40, a thermistor having a diameter of about 3 mm is used. The lead wire 24 is made of a metallic wire having a diameter about 0.5 mm. The lead wire 24 extends from the connecting portion 23 in the resin head 10 to a bottom portion of the resin pipe 30. The pressure sensor 100 is mounted on an intake manifold of an automotive engine to detect air pressure and temperature taken into the engine. An amount of air taken into the engine is calculated based on the detected pressure and temperature. The temperature sensor element 40 has to be positioned close to the lower open end 31 of the resin pipe so that it is exposed to the intake air. For this purpose, the temperature sensor element 40 has to be supported by a thick and strong lead wire 24. However, there is a problem that the thick lead wire reduces a response speed of the temperature sensor and is detrimental to making the sensor device compact.

SUMMARY OF THE INVENTION

The present invention has been made in view of the above-mentioned problem, and an object of the present invention is to provide an improved pressure sensor device having a temperature sensor contained in a common housing, which is compact and has a high response speed.

The pressure sensor device includes a temperature sensor mounted on the same housing on which the pressure sensor is mounted. The pressure sensor detects, for example, an amount of air introduced into an intake manifold of an internal combustion engine based on detected pressure and temperature of the air. The pressure sensor device includes a housing composed of a resin head and a resin pipe, both being hermetically connected to each other. A pressure sensor element such as a piezoelectric element is mounted on a depressed portion formed in the resin head and electrically connected to a first terminal insert-molded in the resin head.

The resin pipe for introducing intake air has a conductor bar embedded therein with its first end exposed in the resin head and its second end exposed to an air passage in the intake manifold. The first end is electrically connected to a second terminal insert-molded in the resin head. The second end is electrically connected to a lead wire of a temperature sensor element such as a thermistor. The temperature sensor element is directly exposed to the intake air in the intake manifold.

A portion connecting the pressure sensor to the first terminal is covered with a protecting member such as fluorine gel, and a portion connecting the lead wire of the temperature sensor to the second end of the conductor bar is covered with protecting resin such as epoxy resin. A cross-section of the embedded portion of the conductor bar is formed in an L-shape or a T-shape to easily position the conductor bar in the molded resin of the resin pipe and to improve its mechanical strength. A diameter of the temperature sensor is preferably made smaller than 1.0 mm. A length of the lead wire of the temperature sensor is preferably made shorter than 30 mm, and its diameter is preferably made smaller than 0.3 mm. A response speed of the temperature sensor is improved by making the size of the temperature sensor and its lead wire small.

According to the present invention, a response speed of the temperature sensor is increased in a compact structure of the pressure sensor device. In addition, no structure for supporting the conductor bar is required since the conductor bar is embedded in the resin pipe. Other objects and features of the present invention will become more readily apparent from a better understanding of the preferred embodiment described below with reference to the following drawings.

DETAILED DESCRIPTION OF THE PREFERRED EMBODIMENT

Figure 1:
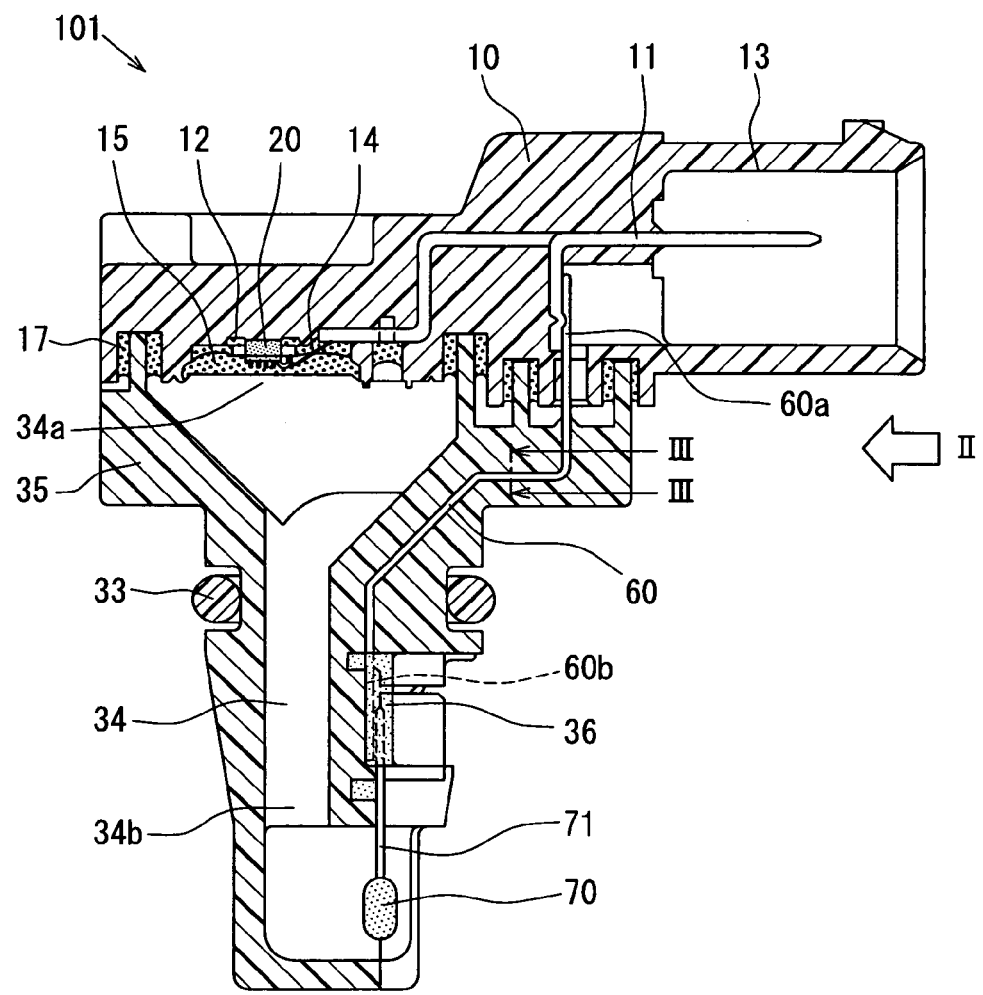
FIG. 1 is a cross-sectional view showing a pressure sensor device having a temperature sensor according to the present invention.
Figure 2:
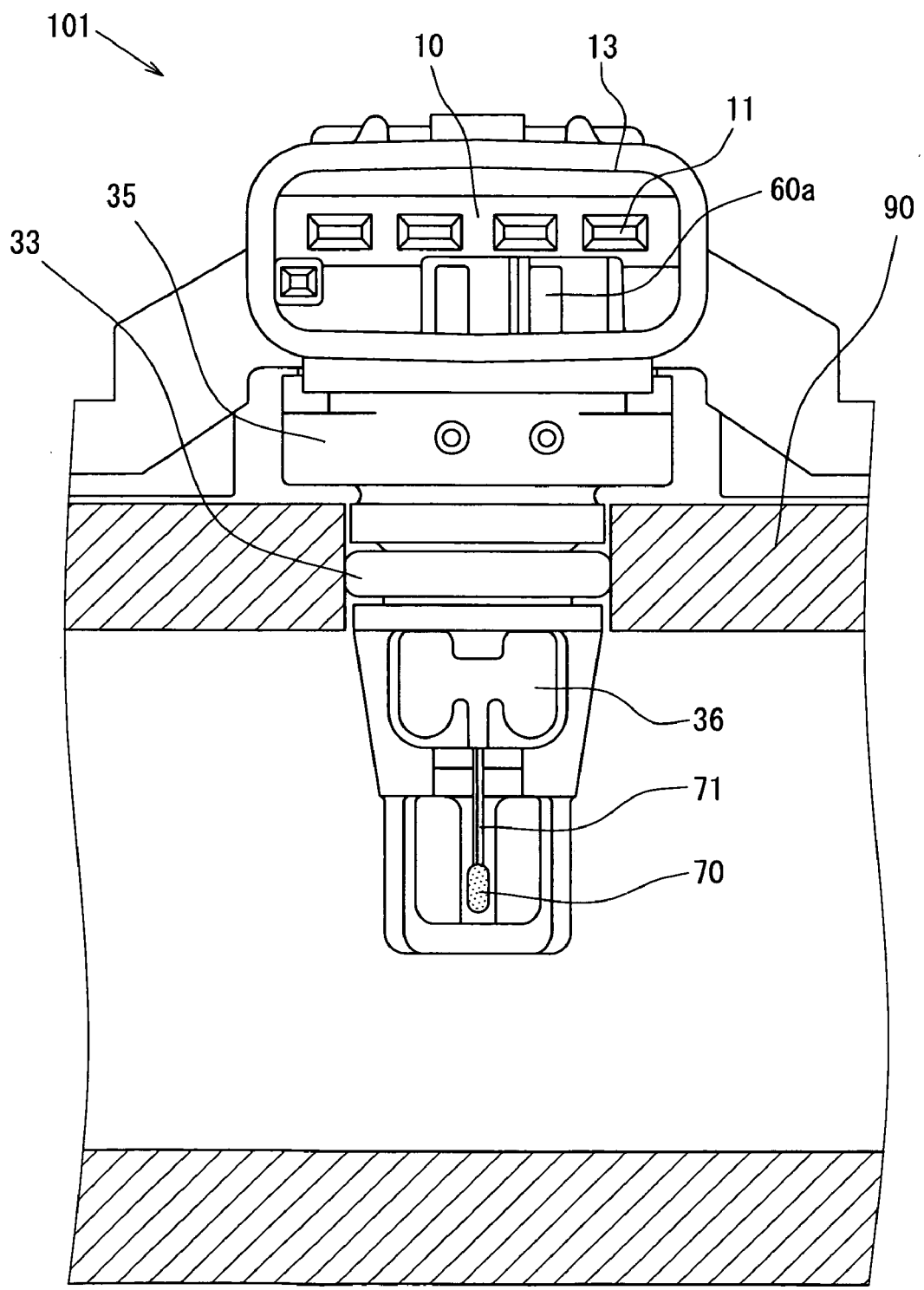
FIG. 2 is a side view showing the pressure sensor device mounted on an intake manifold of an engine, viewed in a direction II shown in FIG. 1.

A preferred embodiment of the present invention will be described with reference to FIGS. 1-4. A pressure sensor device 101 shown in FIG. 1 is mounted on an intake manifold 90 of an internal combustion engine, as shown in FIG. 2. Components that are similar to those of the conventional device shown in FIG. 5 have the same reference numbers.

A pressure sensor element 20, a temperature sensor element 70 and other components are contained in a housing that is composed of a resin head 10 and a resin pipe 35, both made of a resin material. Terminals 11 including a first terminal and a second terminal are insert-molded in the resin head 10. A pressure sensor element 20 is mounted on a depressed portion 12 formed in the resin head 10 and electrically connected to the first terminal (one of the terminals 11). The pressure sensor element 20 detects pressure of air introduced into the housing.

The resin head 10 is made of a resin material, such as polyphenylene sulfide (PPS), polybutylene terephthalate (PBT) or epoxy, by molding. The terminals 11 insert-molded in the resin head 10 are made of a conductive material such as copper or 42-alloy. One end of the first terminal is exposed outside in the depressed portion 12 and plated with gold, so that it functions as a boding pad to be electrically connected to the pressure sensor element 20 through bonding wires 14 made of, e.g., gold or aluminum. The other end of the first terminal is exposed to an opening 13 of the resin head 10 so that it is electrically connected to an outside circuit.

The pressure sensor element 20 detects air pressure introduced into the housing and outputs electrical signals. The pressure sensor element 20 is composed of, for example, a glass substrate and a semiconductor sensor chip mounted on the glass substrate. The semiconductor sensor chip may be a known piezoelectric element having a diaphragm and a bridge circuit formed by diffused resistors. The pressure sensor element 20 is mounted on the depressed portion 12 by connecting its glass substrate to the depressed portion 12 with adhesive.

The pressure sensor element 20 and the bonding wires 14 disposed in the depressed portion 12 are covered with a protecting member 15 made of an insulating material having a corrosion-resistant property, such as fluorine gel or fluorine rubber. In this particular embodiment shown in FIG. 1, the protecting member 15 has a two-layer structure. A lower layer is made of a material having a high elasticity modulus and a corrosion-resistant property, such as fluorine rubber, thereby to suppress generation of bubbles from a boundary between the resin head 10 and the first terminal. An upper layer is made of a low elasticity modulus and a corrosion-resistant property, such as fluorine gel or flurorosilicone gel, thereby to alleviate stress imposed on the pressure sensor element 20 and bonding wires 14.

The resin pipe 35 is made of the same heat-resistant material as the resin head 10, such as PBT or PPS, by molding. The resin pipe 35 has a first opening 34a that is connected to the resin head 10, a pipe portion 34 and a second opening 34b from which air is introduced. An outer periphery of the first opening 34a is hermetically connected to the resin head 40 with adhesive 17 having high elasticity and a corrosion-resistant property, such as hard epoxy, forming a pressure-detecting chamber between the resin head 10 and the resin pipe 35. A temperature sensor element 70 such as a known thermistor element is positioned closed to the second opening 34b so that it is directly exposed to the air introduced into the housing. An o-ring 33 is connected to an outer periphery of the pipe portion 34, so that the pressure sensor device 101 is hermetically connected to an intake manifold 90, as shown in FIG. 2.

A conductor bar 60 made of a material such as brass or phosphor bronze is embedded in the resin pipe 35 with a first end 60a and a second end 60b exposed outside of the resin pipe 35. The second end 60b is electrically connected to a lead wire 71 of the temperature sensor element 70 by soldering, welding or staking. The first end 60a is electrically connected to a second terminal (one of the terminals 11) by welding. The conductor bar 60 is used to electrically connect the temperature sensor element 70 which is far apart from the second terminal disposed in the opening 13 of the resin head 10. The lead wire 71 of the temperature sensor element 70 can be made thin and short by using the conductor bar 60 thereby to improve a response speed of the temperature sensor element 70.

Figure 3A:
FIGS. 3(a), (b) and (c) are drawings, each showing a cross-sectional view of a conductor bar embedded in a resin pipe, taken along line III-III shown in FIG. 1.
Figure 3B:
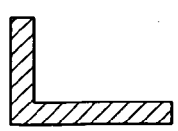
Figure 3C:
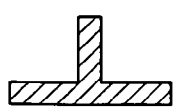

Cross-sectional shapes of the conductor bar 60 at an embedded portion (taken along line III-III shown in FIG. 1) are shown in FIGS. 3A, 3B and 3C, a flat shape in FIG. 3A, an L-shape in FIG. 3B and a T-shape in FIG. 3C. It is preferable to form the cross-section of the conductor bar 60 in the L-shape or the T-shape at the embedded portion to easily position the conductor bar 60 in the mold and to improve its mechanical strength. However, it is preferable to form the cross-sectional shape at the exposed ends, i.e., at the first end 60a and the second end 60b, in a flat shape to make electrical connection to another member easy. It is preferable to make the conductor bar 60 with a conductive material such as brass or phosphor bronze, which is strong and inexpensive.

A portion connecting the second end 60b of the conductor bar 60 to the lead wire 71 of the temperature sensor element 70 is covered with a protecting resin 36 formed by potting or the like, as shown in FIG. 1. The protecting resin 36 is made of an acid-resistant and corrosion-resistant material such as epoxy resin, fluorine rubber or silicone rubber. The connecting portion covered with the protecting resin 36 is positioned close to the temperature sensor element 70 to make the lead wire 71 as short as possible. Accordingly, the protecting resin 36 is exposed to an air passage in the intake manifold 90, as shown in FIG. 2. However, since the connecting portion is covered with the protecting resin 36, it is protected from corrosion and contamination. Further, the connecting portion is prevented from electrical leakage due to humid air.

Since the temperature sensor element 70 is electrically connected to the second terminal (one of the terminals 11) through the conductor bar 60 embedded in the resin pipe 35, the lead wire 71 can be made thin and short, compared with that of the conventional device. In addition, the temperature sensor element 70 that is compact and light can be used. Therefore, a response speed of the temperature sensor element can be increased, while making the pressure sensor device 101 compact.

Preferably, an inexpensive and compact thermistor is used as the temperature sensor element 70. Preferably, a thermistor having a diameter of 1.0 mm or less is used (though the size of temperature sensor element 70 shown in FIG. 1 is relatively large). It is also preferable to use the lead wire 71 having a diameter of 0.3 mm or less. It is preferable to make the length of the lead wire 71 longer than 15 mm to make easy its connecting process. It is preferable to make the length of the lead wire 71 shorter than 30 mm to secure a sufficient strength against vibrations. Preferably, the connecting portion between the conductor bar 60 and the lead wire 71 is positioned at a point, a distance to which from a tip (a bottom) of the resin pipe 35 does not exceed half a length of the resin pipe 35. A length of the lead wire 71 exposed outside of the resin pipe 35 is preferably set to a length not exceeding 10 mm. If that length were too long, the temperature sensor 70 would not be sufficiently held by the lead wire 71.

Figure 4:
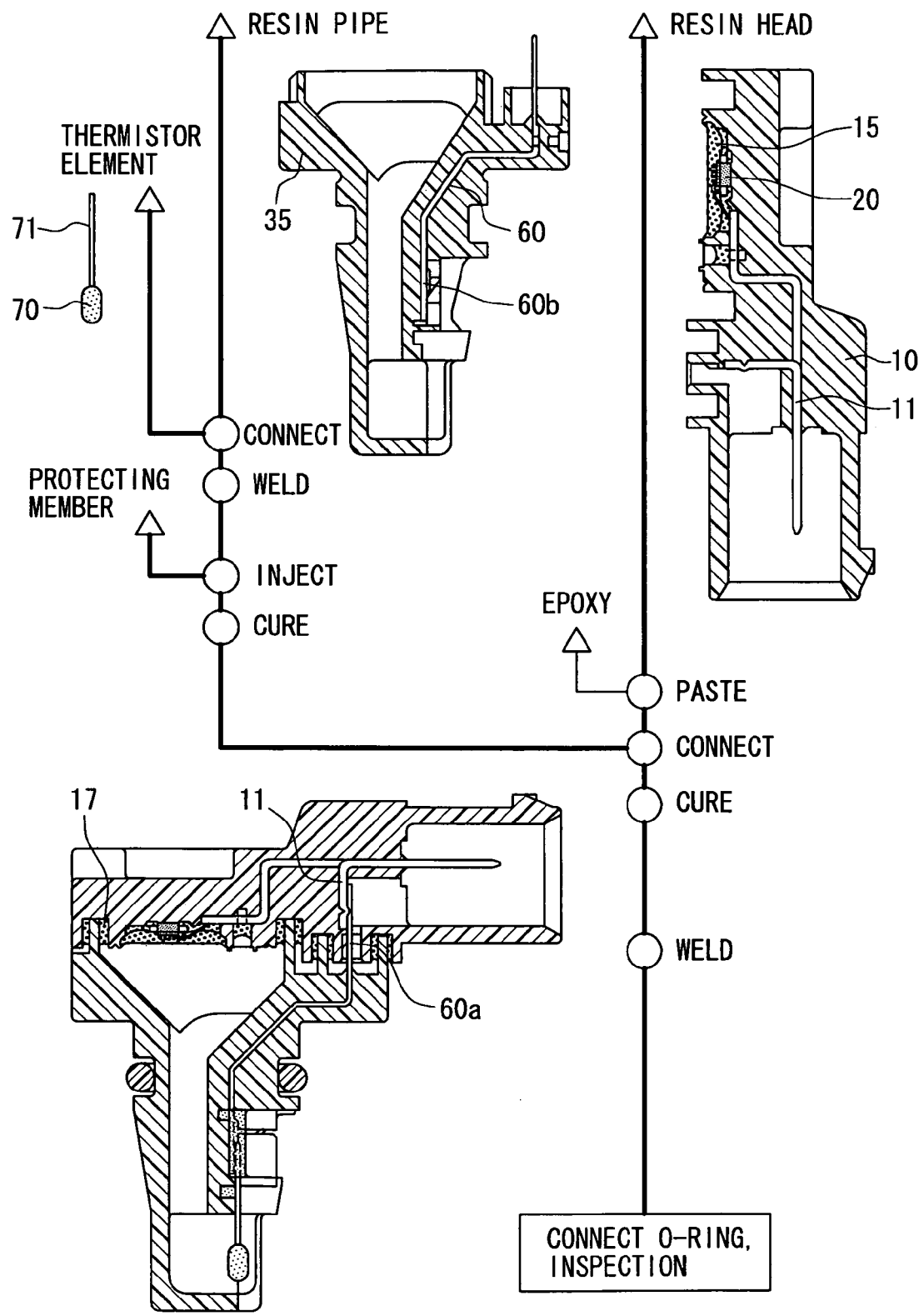
FIG. 4 is a drawing showing a process of manufacturing the pressure sensor device shown in FIG. 1.
Figure 5:
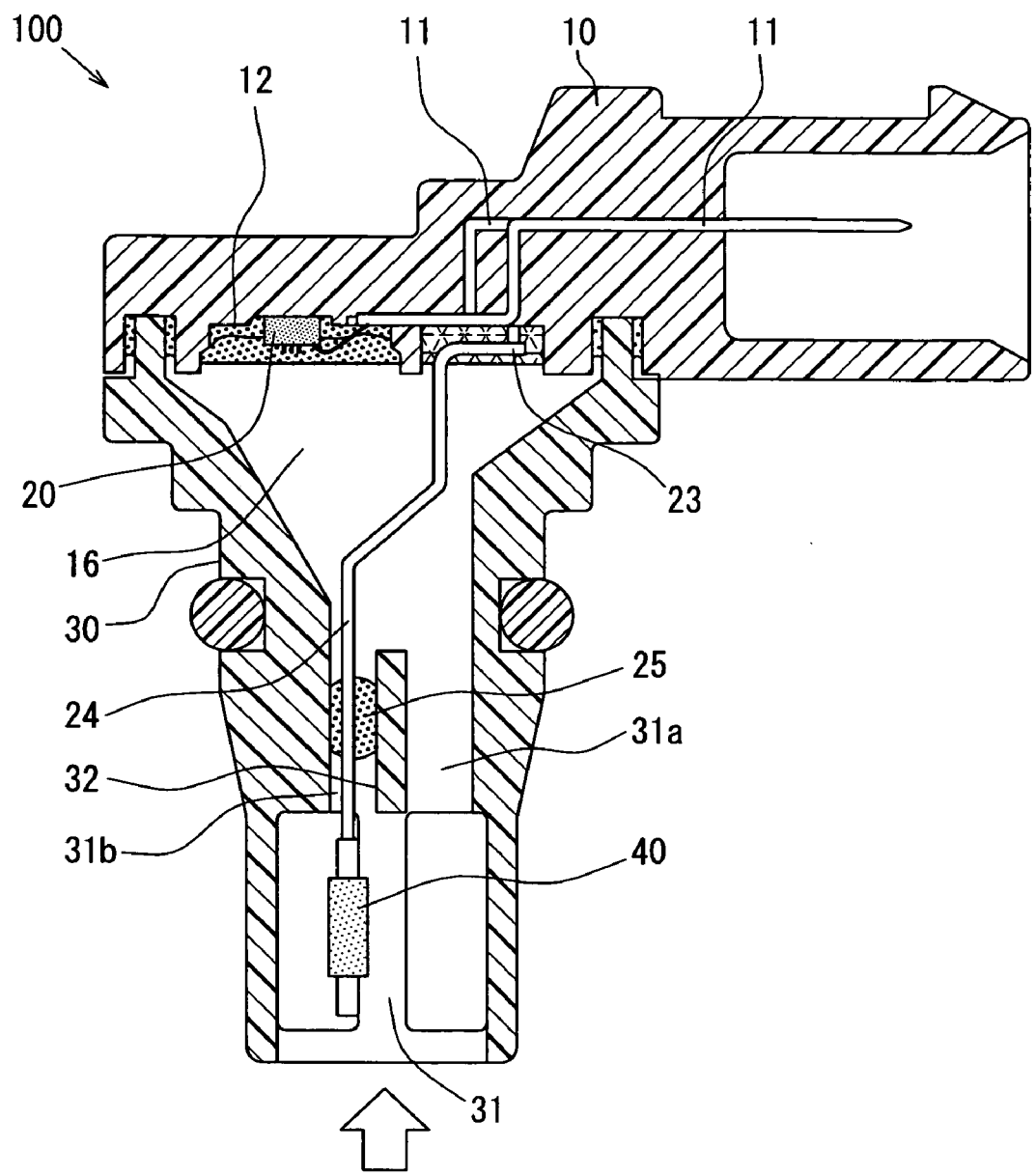
FIG. 5 is a cross-sectional view showing a conventional pressure sensor device.

A manufacturing process of the pressure sensor device 101 will be briefly explained with reference to FIG. 4. The resin head 10 and the resin pipe 35 are separately made. In a process of making the resin head 10, the terminals 11 are insert-molded together with the main body of the resin head 10. The pressure sensor element 20 is mounted on the depressed portion 12 of the resin head 10 and connected thereto with adhesive. The pressure sensor element 20 is electrically connected to the terminal 11 through bonding wires 14. The depressed portion 12 is covered with the protecting member 15, and thereafter, the protecting member 15 is cured.

In a process of making the resin pipe 35, the conductor bar 60 is insert-molded together with the main body of the resin pipe 35. The lead wire 71 of the temperature sensor element 70 is connected to the second end 60b of the conductor bar 60 by resistance welding or the like. The portion connecting the conductor bar 60 to the lead wire 71 is covered with the protecting resin 36, and thereafter the protecting resin 36 is hardened. Then, the resin pipe 35 is hermetically connected to the resin head 10 with adhesive 17. Finally, the first end 60a of the conductor bar 60 is electrically connected to the second terminal by resistance welding or the like.

Advantages of the present invention will be summarized below. Since the lead wire 71 of the temperature sensor element 70 is connected to the terminal through the embedded conductor bar 60, the lead wire 71 can be made thin and short, while making the temperature sensor element 70 compact. Therefore, the temperature sensor element 70 quickly responses to changes in temperature. Since the resin head 10 and the resin pipe 35 are separately formed, each of them can be standardized. Various types of the pressure sensor devices 101 can be made by assembling various types of the pressure sensor elements 20 and the temperature sensor elements 70 to the standardized resin head 10 and the resin pipe 35. An amount of air is accurately calculated based on the detected air pressure and the detected air temperature. Since the pressure sensor device 101 including the temperature sensor is compact, it is easily mounted on an intake manifold of an internal combustion engine.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A pressure sensor device comprising:
    a housing composed of a resin head and a resin pipe, one end of the resin pipe being connected to the resin head and the other end of the resin pipe being open to outside;
    terminals, having a first terminal and a second terminal, to be electrically connected to an outside circuit, the terminals being insert-molded in the resin head;
    a pressure sensor element for detecting pressure of fluid introduced into the housing through the resin pipe, the pressure sensor element being electrically connected to the first terminal and mounted on the resin head;
    a conductor bar embedded in the resin pipe with its first end and a second end exposed outside; and
    a temperature sensor element for detecting temperature of the fluid, the temperature sensor element being positioned close to the open end of the resin pipe, wherein:
    the first end of the conductor bar is electrically connected to the second terminal; and
    the second end of the conductor bar is positioned close to the open end of the resin pipe and electrically connected to the temperature sensor element through a lead wire having a diameter smaller than a predetermined diameter;
    a length of the lead wire is set in a predetermined range by providing the conductor bar electrically connecting the lead wire and the second terminal in the resin head; and
    a portion connecting the second end of the conductor bar to the lead wire is covered with protective resin potting.

2. The pressure sensor device as in claim 1, wherein the protective resin potting is one of epoxy resin, fluorine rubber and silicone rubber.

3. The pressure sensor device as in claim 1, wherein the temperature sensor element is a thermistor element.

4. The pressure sensor device as in claim 3, wherein a diameter of the thermistor is 1.0 mm or less.

5. The pressure sensor device as in claim 3, wherein a diameter of the lead wire is 0.3 mm or less.

6. The pressure sensor device as in claim 3, wherein a length of the lead wire is longer than 15 mm and shorter than 30 mm.

7. The pressure sensor device as in claim 1, wherein a cross-section of the embedded portion of the conductor bar is L-shaped.

8. The pressure sensor device as in claim 1, wherein a cross-section of the embedded portion of the conductor bar is T-shaped.

9. The pressure sensor device as in claim 1, wherein the conductor bar is made of brass or phosphor bronze.

10. The pressure sensor device as in claim 1, which is for use in an intake manifold of an internal combustion engine.

11. The pressure sensor device as in claim 10, wherein the pressure sensor device detects pressure and temperature of intake air introduced through the intake manifold.

12. The pressure sensor device as in claim 11, wherein the temperature sensor element is directly exposed to the intake air introduced through the intake manifold.

* * * * *